US011725430B2

(12) United States Patent
Fenby

(10) Patent No.: US 11,725,430 B2
(45) Date of Patent: Aug. 15, 2023

(54) APPARATUS AND METHOD TO DISABLE VEHICLE DOOR-ACTUATED FUNCTIONS

(71) Applicant: Austin Ray Fenby, Shepherd, MI (US)

(72) Inventor: Austin Ray Fenby, Shepherd, MI (US)

(*) Notice: Subject to any disclaimer, the term of this patent is extended or adjusted under 35 U.S.C. 154(b) by 42 days.

(21) Appl. No.: 17/095,630

(22) Filed: Nov. 11, 2020

(65) Prior Publication Data

US 2021/0140205 A1  May 13, 2021

Related U.S. Application Data

(60) Provisional application No. 62/933,736, filed on Nov. 11, 2019.

(51) Int. Cl.
*E05B 85/04* (2014.01)
*B60J 5/04* (2006.01)
*E05B 85/00* (2014.01)

(52) U.S. Cl.
CPC ............. *E05B 85/04* (2013.01); *B60J 5/04* (2013.01); *E05Y 2900/531* (2013.01)

(58) Field of Classification Search
CPC .... E05B 85/04; E05B 85/045; E05B 17/0045; Y10S 292/15; Y10S 292/56; Y10T 292/03; Y10T 292/34; Y10T 292/379; Y10T 292/397; Y10T 292/71; Y10T 292/73; Y10T 16/61; Y10T 16/625; Y10T 16/628; Y10T 16/6285; Y10T 16/629; E05F 5/02; E05F 5/022; E05F 5/025; E05C 17/047; E05C 17/54; E05C 21/005; B60J 5/04
USPC ....................................................... 296/207
See application file for complete search history.

(56) References Cited

U.S. PATENT DOCUMENTS

| 2,975,491 | A | * | 3/1961 | Paul | E06B 3/28 |
| | | | | | 206/820 |
| 3,735,890 | A | * | 5/1973 | Archibald | E05C 17/54 |
| | | | | | 217/61 |
| 5,035,449 | A | * | 7/1991 | Shiratori | E05C 7/06 |
| | | | | | 292/DIG. 43 |
| 5,217,269 | A | * | 6/1993 | Wiltberger | E05C 17/54 |
| | | | | | 292/343 |
| 5,551,738 | A | * | 9/1996 | Thorlton | E05C 17/042 |
| | | | | | 292/288 |
| 6,003,911 | A | * | 12/1999 | Sowash | E05C 17/025 |
| | | | | | 292/288 |
| 6,048,005 | A | * | 4/2000 | Rotondi | E05C 17/042 |
| | | | | | 292/262 |
| 7,988,210 | B2 | * | 8/2011 | Shibata | E05C 17/04 |
| | | | | | 49/394 |

(Continued)

FOREIGN PATENT DOCUMENTS

| DE | 102005034098 A1 * | 1/2007 | ............ B60R 21/38 |
| DE | 102007048781 A1 * | 6/2009 | ............ B60J 5/0473 |
| KR | 20090005582 A * | 1/2009 | |

*Primary Examiner* — Carlos Lugo
(74) *Attorney, Agent, or Firm* — Poznak Dyer Kanar Schefsky Thompson PLC

(57) ABSTRACT

An apparatus for use with a vehicle door having a latch includes a striker member configured to engage the latch, and a bumper positioned relative to the striker member such that if the door is moved to the closed position, the bumper absorbs the impact with the striker to avoid damage and excess sound. The apparatus enables the vehicle door to remain open without the vehicle's interior light or ignition key reminder chime being activated.

14 Claims, 7 Drawing Sheets

(56) References Cited

U.S. PATENT DOCUMENTS 8,231,152 B2 * 7/2012 Carlson ................ E05C 17/042
  24/599.6
9,617,762 B2 * 4/2017 Fannon .................. E05B 83/24

* cited by examiner

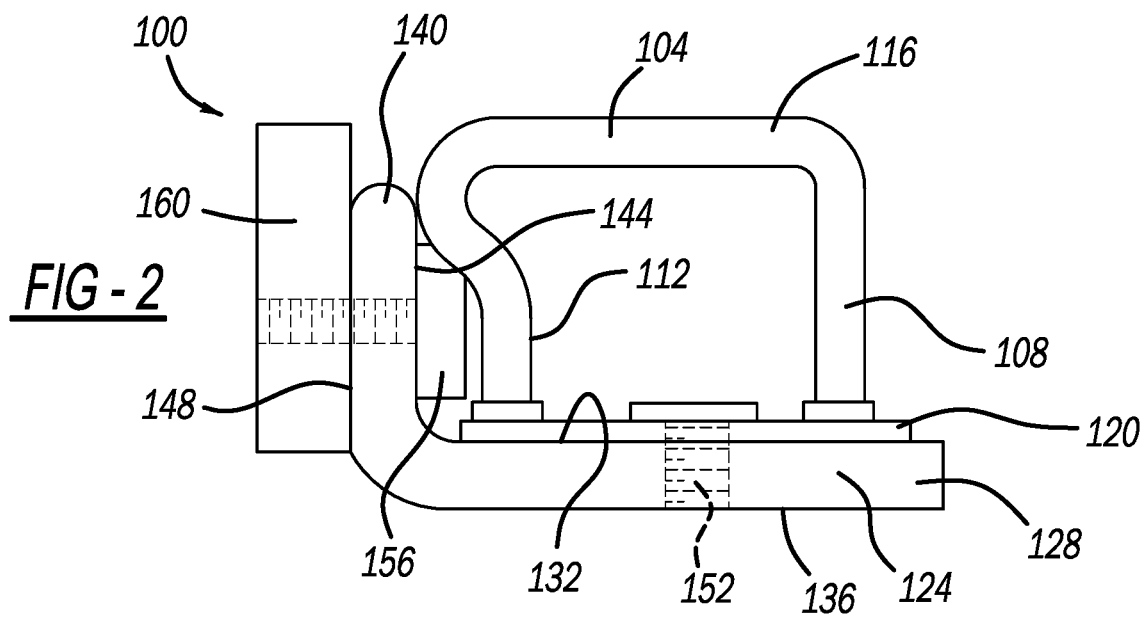
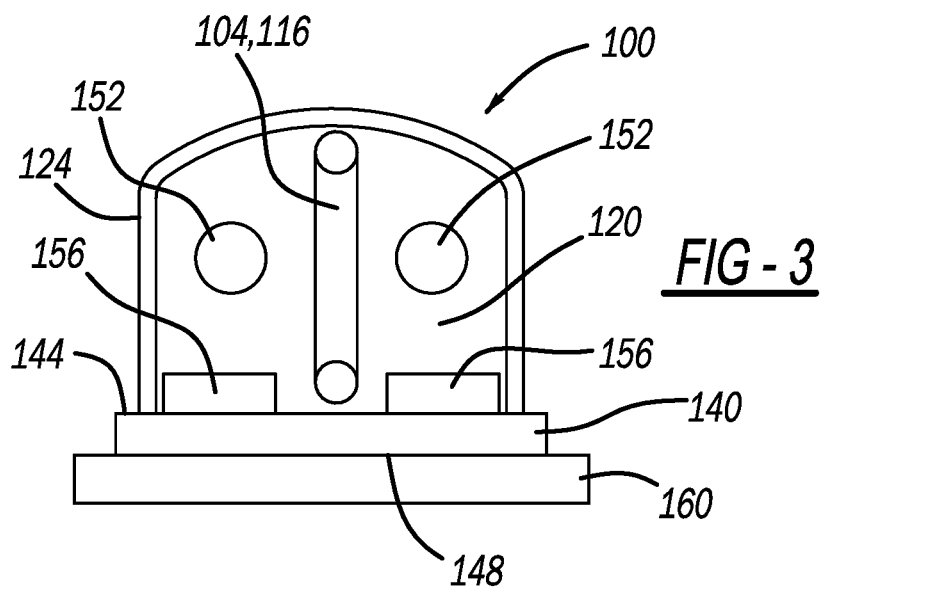
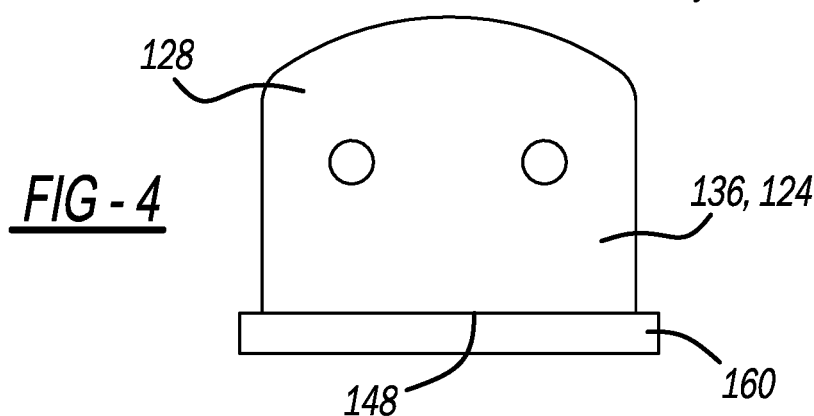

APPARATUS AND METHOD TO DISABLE VEHICLE DOOR-ACTUATED FUNCTIONS

CROSS-REFERENCE TO RELATED APPLICATIONS

This application claims the benefit of U.S. Provisional Patent Application No. 62/933,736, filed Nov. 11, 2019, and which is hereby incorporated by reference in its entirety.

TECHNICAL FIELD

This disclosure relates to automotive doors.

BACKGROUND

Automobiles, including cars, pickup trucks, sport-utility vehicles, etc., include passenger doors to permit ingress and egress to and from a passenger compartment. A latch is used to maintain the doors in the closed position. Many automobiles include sensors that sense when the door latch is engaged, and thus the sensors monitor whether the door is in the closed position or in an open position.

Automobiles are often configured with various functions that are dependent on the status of the door latch sensor because it is desirable for these functions to be actuated when the door is open or closed. For example, motor vehicles typically have a dome light or other interior lights that illuminate the passenger compartment. Many vehicles are configured such that the dome light automatically turns on when a passenger door is open to facilitate passenger ingress and egress.

Similarly, motor vehicles often include chimes that sound to alert a driver that a key is in the ignition so that the driver does not inadvertently leave the key in the car after the driver exits the vehicle. Typically, the vehicle is configured to produce the chime sound automatically when the key is in the ignition and the driver's door is open.

SUMMARY

According to a first aspect of the invention, a method is provided for use with a vehicle. The vehicle includes a body defining a passenger compartment and a door opening, a door selectively movable with respect to the body between an open and closed position, a latch mounted to the door, and a striker mounted to the body and positioned to engage the latch when the door is in the closed position. The method includes moving the door to the open position, and engaging an apparatus with the latch when the door is in the open position to cause a sensor to indicate that the latch is engaged with the striker.

According to a second aspect of the invention, an apparatus for use with a vehicle door is provided. The vehicle door is selectively movable between an open position and a closed position, and includes a latch that is releasably engageable with a striker mounted to a vehicle body when the vehicle door is in the closed position. The apparatus includes a striker member characterized by a size and shape such that the member is engageable with the latch when the vehicle door is in an open position, and a bumper mounted with respect to the striker member such that, if the vehicle door is moved to the closed position with the striker member engaged with the latch, the bumper contacts the striker.

The method and apparatus provided herein simulate the condition of the vehicle door being closed, even though it is in the open position, thereby preventing the interior light from turning on, the chime from sounding, and any other automatic functions that occur when the vehicle sensors indicate that the door is unlatched. Situations may arise when these functions are not desired. For example, during vehicle servicing and maintenance, it may be desired for the key to remain in the ignition and the door to remain in the open position for an extended period of time; however, the chiming may cause annoyance and distraction to the mechanic performing the service on the vehicle and the dome light may drain the battery. Accordingly, the apparatus and method may be particularly useful for mechanics and others in the vehicle service industry, though it should be noted that the method and apparatus may be employed in other scenarios and situations within the scope of the claimed invention.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a schematic, side view of an apparatus in accordance with the claimed invention and engageable with the latch in the door assembly of FIG. 1;

FIG. 3 is a schematic, top view of the apparatus of FIG. 2;

FIG. 4 is a schematic, bottom view of the apparatus of FIG. 2;

DESCRIPTION OF THE PREFERRED EMBODIMENTS

Figure 1:
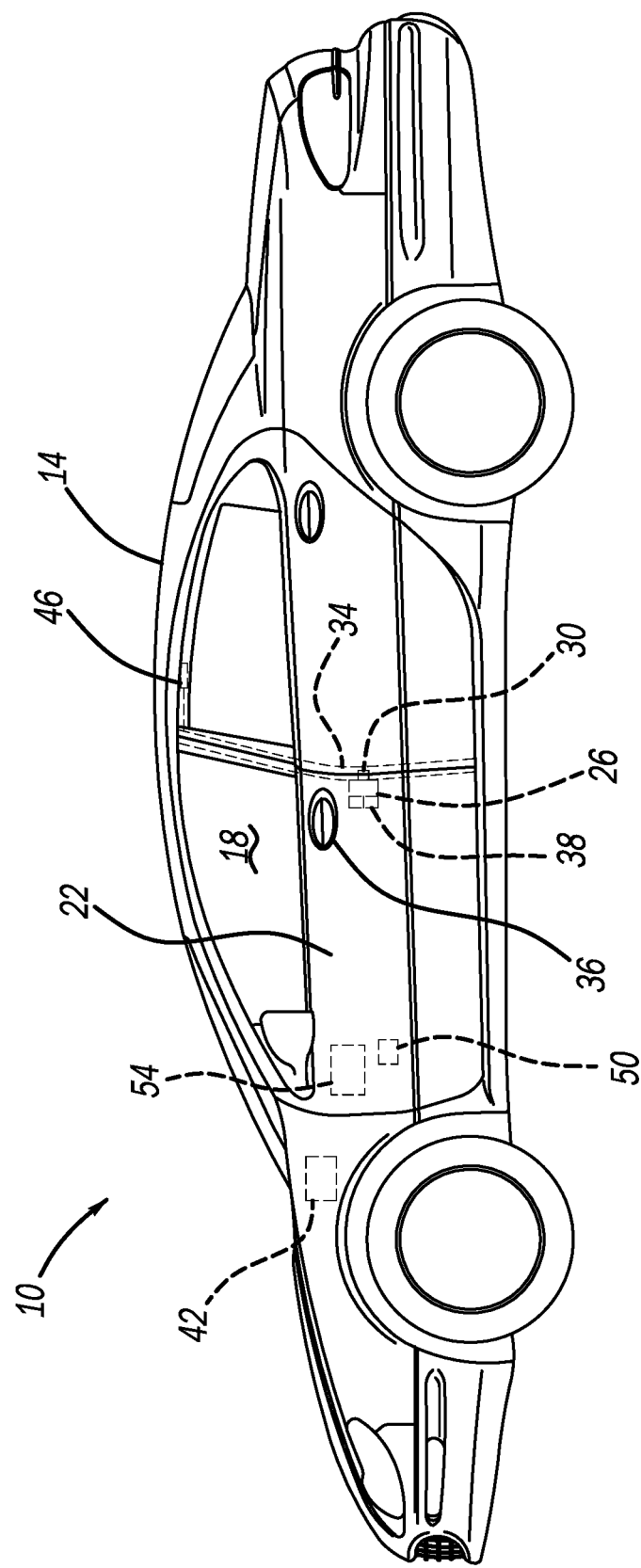
FIG. 1 is a schematic, side view of a vehicle having a door assembly with a latch.
Figure 5:
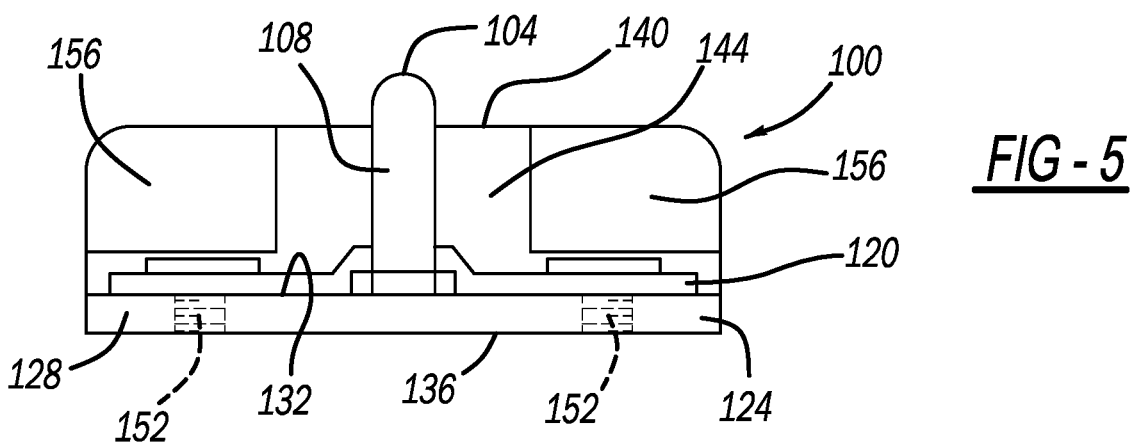
FIG. 5 is a schematic, front view of the apparatus of FIG. 2.
Figure 6:
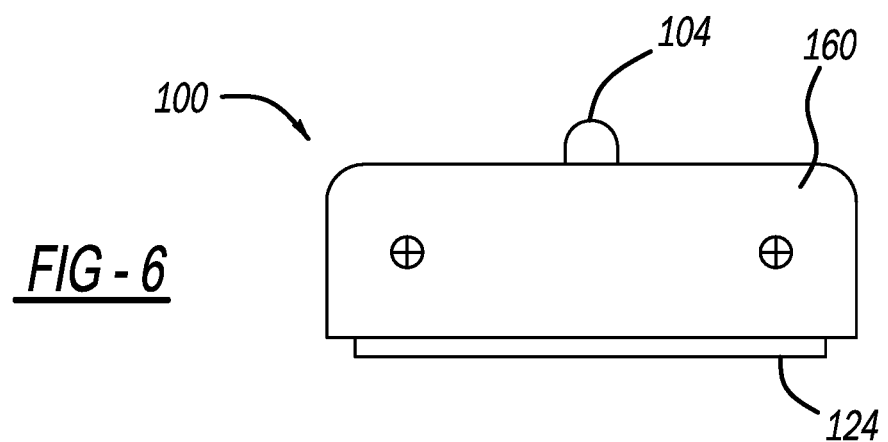
FIG. 6 is a schematic, rear view of the apparatus of FIG. 2.

Referring to FIG. 1, a vehicle 10 is schematically depicted. The vehicle 10 depicted is a sedan, though other vehicle configurations may be employed within the scope of the claimed invention, including, but not limited to, pickup trucks, vans, sport-utility vehicles, etc. The vehicle 10 includes a body 14 that defines a passenger compartment 18. The vehicle 10 includes a plurality of door assemblies, including driver's door assembly 22, that are selectively movable between open and closed positions, as understood by those skilled in the art. The door assembly 22 includes a latch 26, which is typically disposed inside a door cavity formed between inner and outer door panels. The body 14 includes a striker 30 mounted to a body pillar 34, as understood by those skilled in the art. The latch 26 and the striker 30 are positioned such that the striker 30 engages the latch 26 when the door 22 is moved to its closed position, thereby retaining the door 22 in its closed position until the latch 26 is released via a door handle 36.

The latch 26 includes a sensor 38 that detects whether striker 30 is engaged with the latch 26. The sensor 38 is operatively connected to a body control module 42, which is configured to turn on a dome light 46 inside the passenger compartment 18 when sensor 38 indicates that the striker 30 and the latch 26 are not engaged with each other. The body control module 42 is also configured to create an audible sound (sometimes referred to as a "chime") inside the passenger compartment 18 when a key is in the ignition switch 50 and sensor 38 indicates that the striker 30 and the latch 26 are not engaged with each other. Speaker 54 may be employed to create the chime.

FIGS. 2-6 schematically depict an apparatus 100 for disabling the chime and the dome light 46, as well as any other components of the vehicle 10 that are activated, at least in part, by the status of sensor 38. Referring to FIGS. 2-6, wherein like reference numbers refer to like components throughout, the apparatus 100 includes a striker member 104. The striker member 104 is configured in size and shape to engage the latch (shown at 26 in FIG. 1) and thereby cause sensor 38 to indicate the latch 26 is engaged and thereby simulate the door being in the closed position.

In the embodiment depicted, the striker member 104 is generally U-shaped, having two generally parallel segments 108, 112 interconnected by segment 116, which is substantially perpendicular to segments 108, 112. Segments 108, 112 extend from a base plate 120. The base plate 120 is mounted to bracket member 124. Bracket member 124 has a generally L-shaped cross-sectional shape. More specifically, bracket member 124 includes a first portion 128 having a first substantially planar surface 132 and a second substantially planar surface 136. Surfaces 132, 136 are substantially parallel to one another and face opposite directions.

The bracket member 124 also includes a second portion 140 that is substantially perpendicular to the first portion 128. The second portion 140 defines a third substantially planar surface 144 and a fourth substantially planar surface 148, which are parallel to one another and perpendicular to surfaces 132, 136. The base plate 120 is in contact with surface 132 and mounted to the bracket member 124 such as via one or more threaded fasteners 152.

The apparatus 100 also includes two energy absorbing members 156 mounted to surface 144 and another energy absorbing member 160 (sometimes referred to herein as a "bumper") mounted to surface 148. Energy absorbing members 156, 160 are relatively soft and deformable. Exemplary materials for members 156, 160 include, but are not limited to, rubber or other elastomers, polymeric foam, etc.

Figure 7:
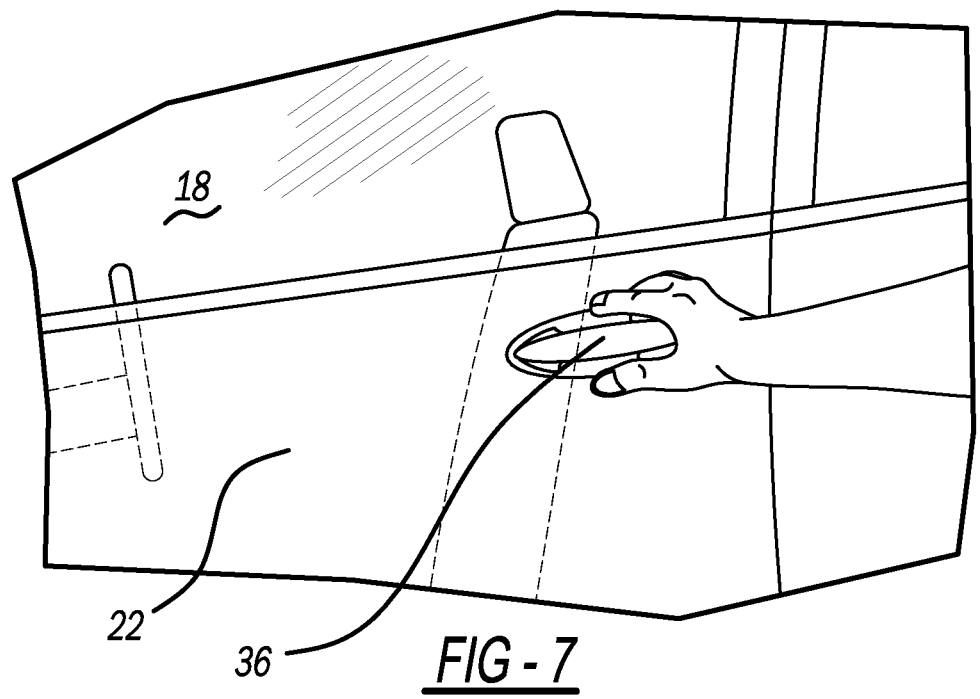
FIG. 7 is a schematic, side view of a portion of the vehicle with the door assembly in its closed position.
Figure 8:
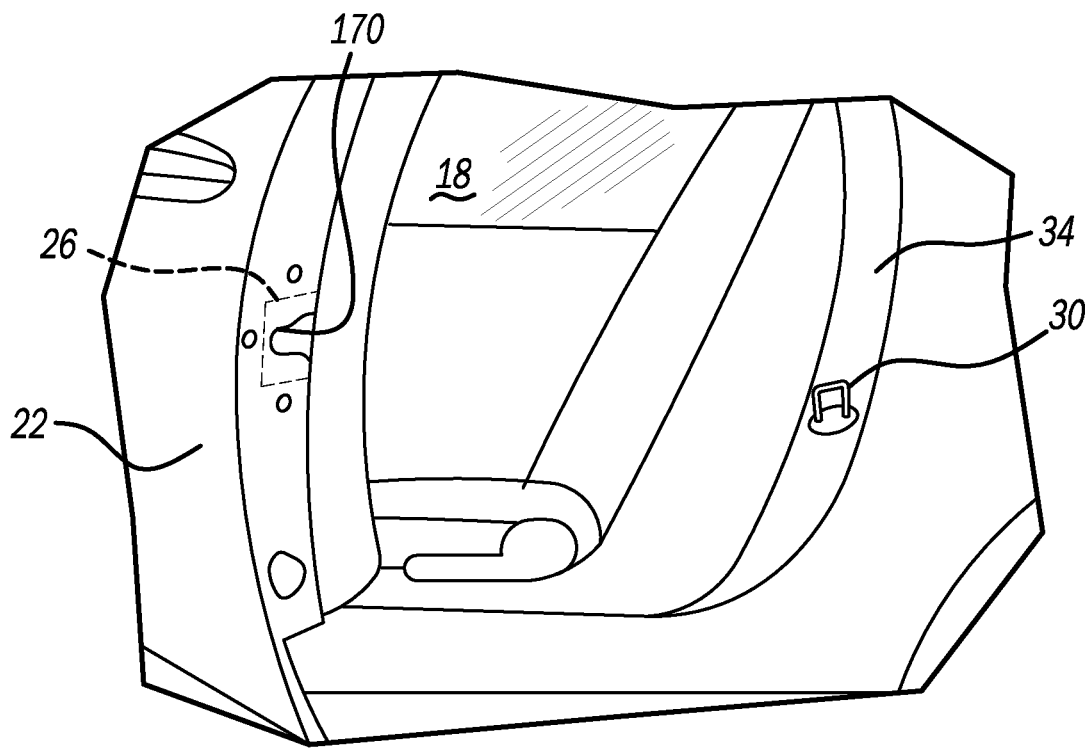
FIG. 8 is a schematic, side view of a portion of the vehicle with the door assembly in an open position.
Figure 9:
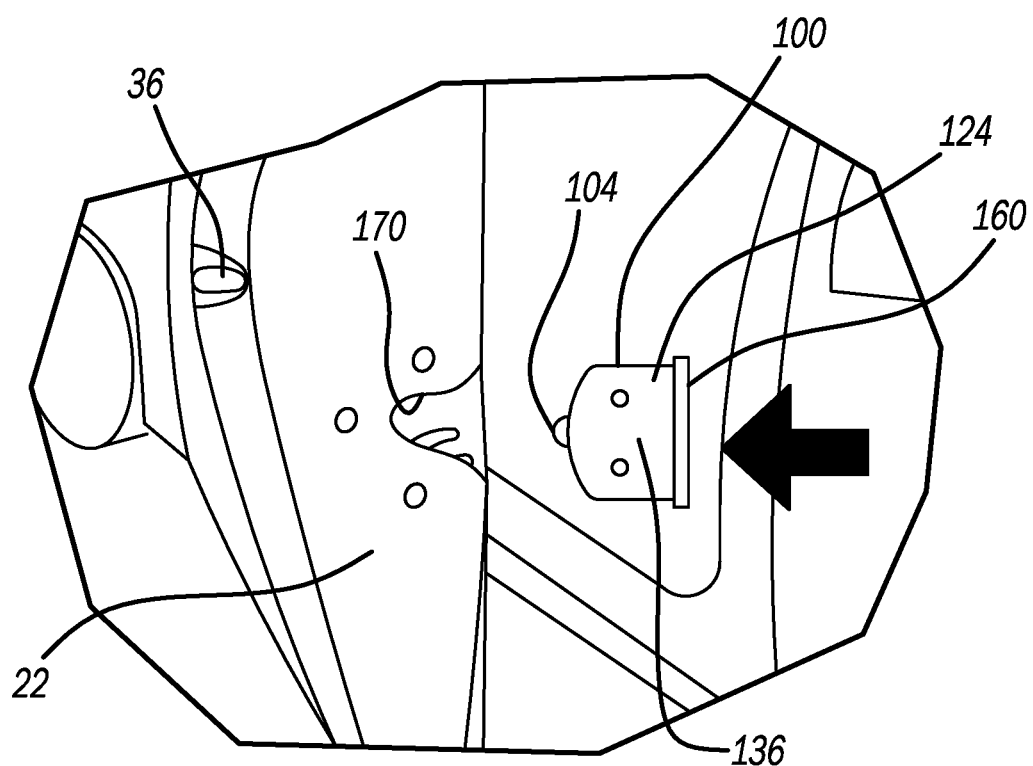
FIG. 9 is a schematic, perspective view of the door assembly with the apparatus aligned for engagement with the latch.
Figure 10:
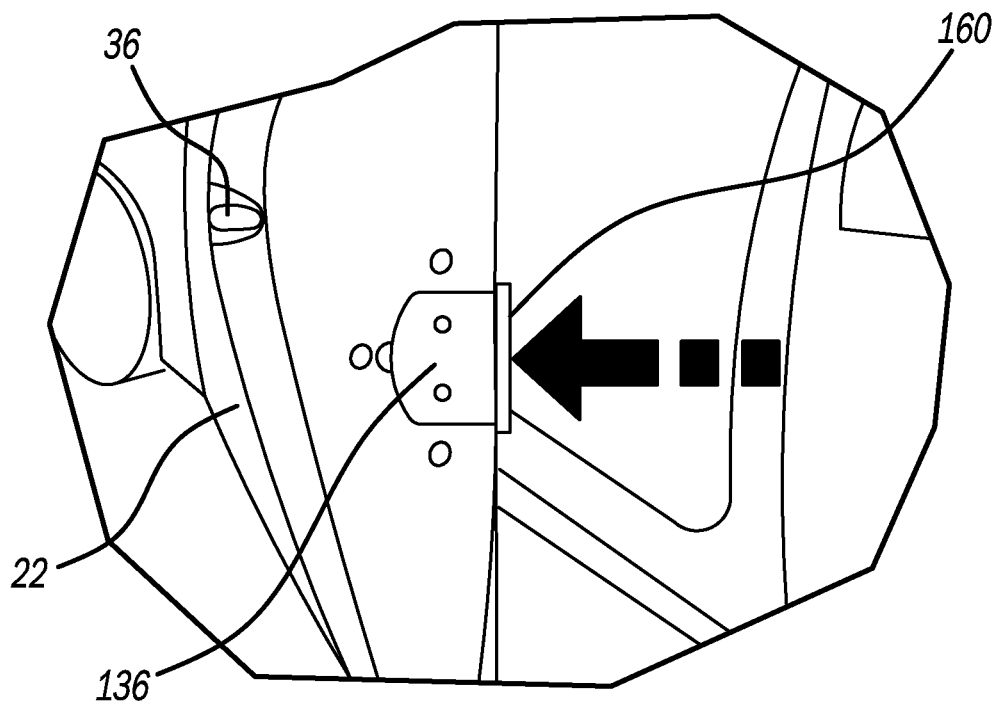
FIG. 10 is a schematic, perspective view of the door assembly with the apparatus engaged with the latch.

FIGS. 7-13, wherein like reference numbers refer to like components from FIGS. 1-6, schematically depict a method of using the apparatus 100. Referring to FIGS. 7 and 8, the method includes using the handle 36 to disengage the latch 26 from the striker 30, as shown in FIG. 7, and move the door assembly 22 to an open position, as shown in FIG. 8. When the door assembly 22 is in its open position, the latch 26 is accessible through an aperture 170 in the inner panel of the door assembly 22. The method further includes moving the apparatus 100 so that the striker member 104 extends through the aperture 170 and into engagement with the latch 26, as shown in FIGS. 9 and 10, thereby causing the sensor 38 to indicate to the body control module 42 that the door assembly 22 is in its closed position. Energy absorbing members 156 prevent over-insertion of the striker member 104 and prevent any metal-to-metal contact between the apparatus 100 and the door assembly.

Figure 11:
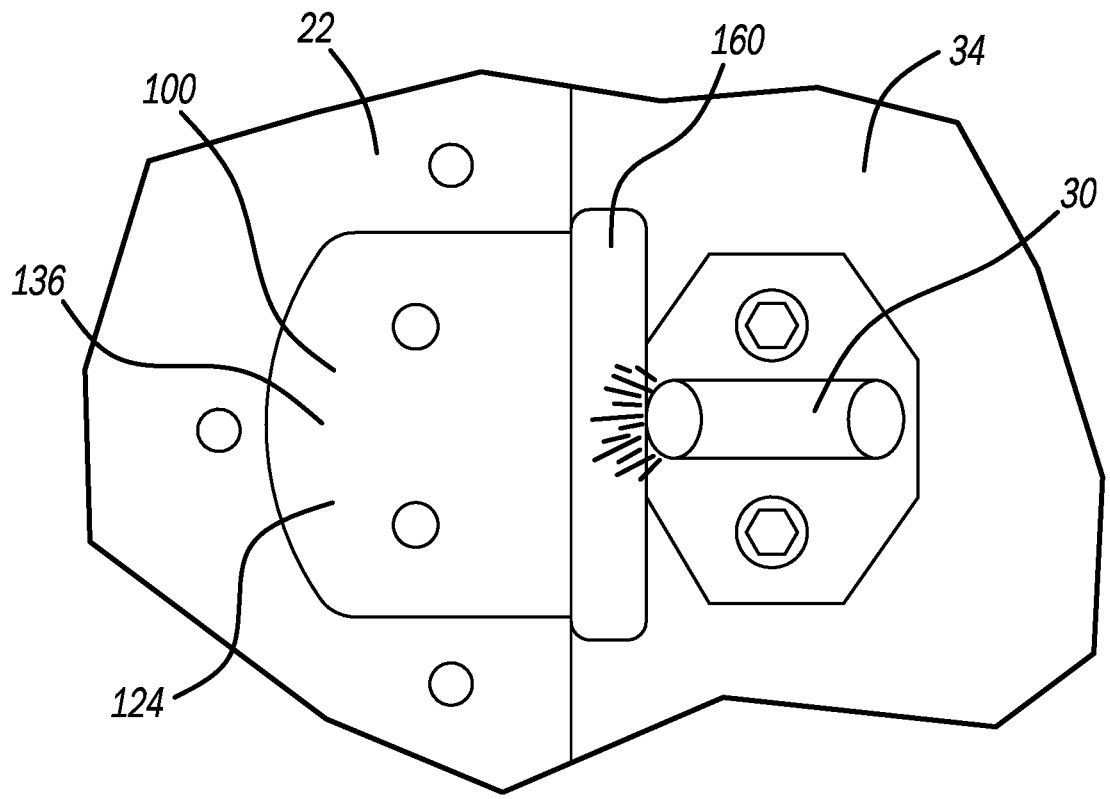
FIG. 11 is a schematic view of the apparatus contacting the striker on the vehicle's pillar.

Referring to FIG. 11, if the door assembly 22 moves toward its closed position with the apparatus 100 engaged with the latch 26, the energy absorbing member 160 is positioned to contact the striker 30, thereby preventing any damage to the striker 30 and reducing any noise generated by the impact.

Figure 12:
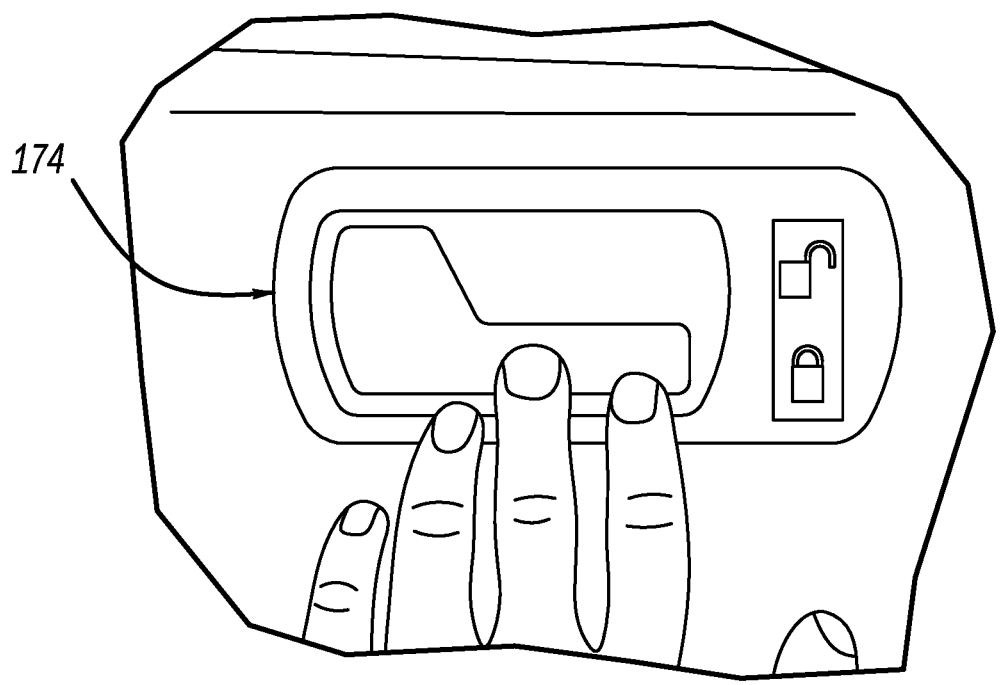
FIG. 12 is a schematic, side view of an interior door handle.
Figure 13:
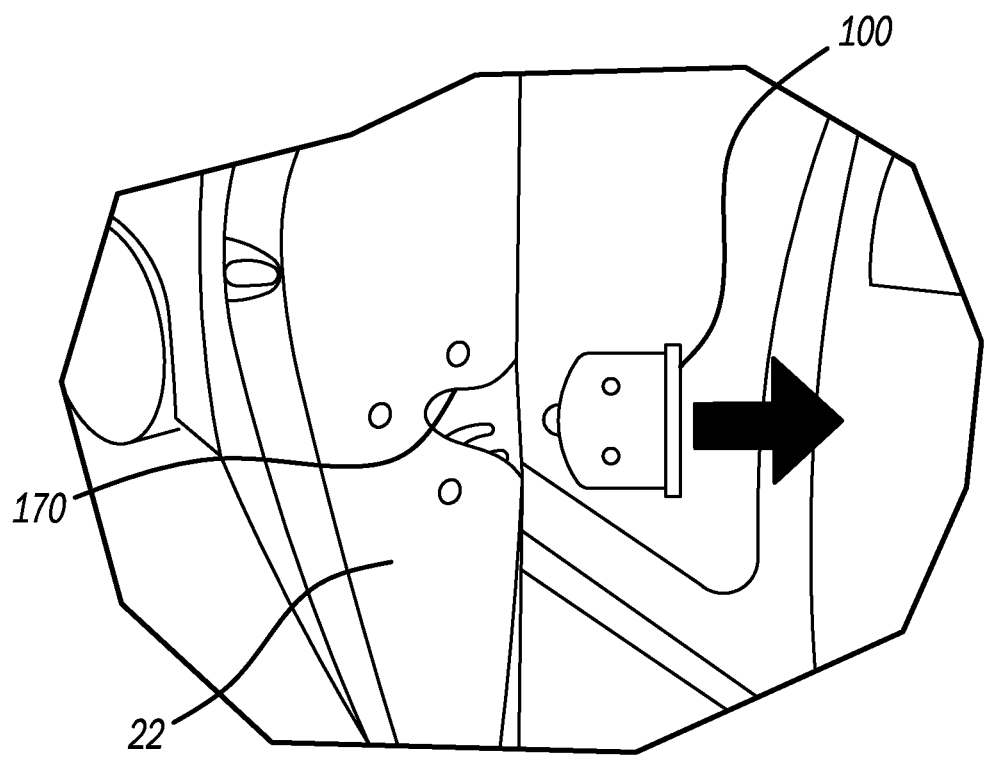
FIG. 13 is a schematic, perspective view of the door assembly with the apparatus being removed.

Referring to FIGS. 12 and 13, the apparatus 100 is removed from the door assembly 22 by activating one of the door handles, such as the interior door handle shown at 174, which then permits the release of the apparatus 100 from the latch 26.

Figure 14:
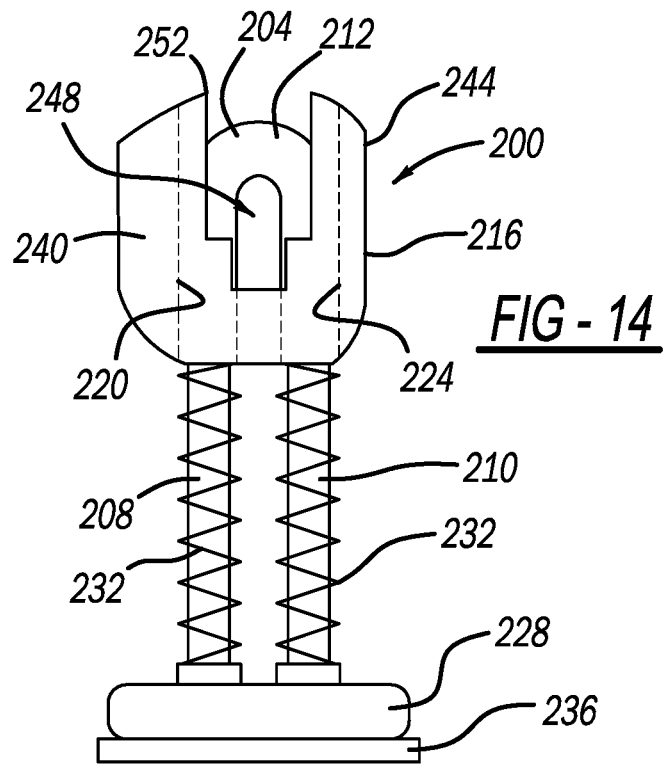
FIG. 14 is a schematic, top view of an alternative apparatus in accordance with the claimed invention.

FIGS. 13 and 14 schematically depict an alternative apparatus 200 within the scope of the claimed invention for disabling door-related functions such as the chime and the interior light. Referring specifically to FIG. 13, the apparatus 200 includes a striker member 204 that is engageable with the latch (shown at 26 in FIGS. 1 and 15). The striker member 204 includes first and second parallel segments 208, 210 and a third curved segment 212 that interconnects the first and second parallel segments 208, 210 at one end of the striker member 204. Accordingly, the striker member 204 is characterized by a generally U-shaped geometry.

The apparatus 200 also includes a stabilizing member 216 that is movably connected to the striker member 204. More specifically, in the embodiment depicted, the stabilizing member 216 defines a first hole 220 and a second hole 224. The first segment 208 extends through the first hole 220, and the second segment 210 extends through the second hole 224. Accordingly, the stabilizing member 216 is slidable along the first and second parallel segments 208, 210.

The apparatus 200 also includes a base member 228 operatively connected to the first and second parallel segments 208, 210. In the embodiment depicted, the base member 228 defines two holes (not shown); the end of segment 208 extends into one of the two holes and the end of segment 210 extends into the other of the two holes. The apparatus 200 also includes at least one spring 232 positioned between the stabilizing member 216 and the base member 228 and biasing the stabilizing member 216 away from the base member 228 and toward the third segment 212.

In the embodiment depicted, the apparatus includes two springs 232. Springs 232 are coil springs, and each spring 232 has a respective one of the segments 208, 210 extending therethrough. Each spring 232 contacts the base member 228 and the stabilizing member 216, urging the stabilizing member 216 away from the base member 228 and into a first position adjacent the third segment 212 as shown in FIG. 14. A bumper 236 is attached to the side of the base member 228 opposite the striker member 204. The bumper 236 is positioned relative to the striker member 204 such that the bumper 236 contacts the striker 30 if the door 22 is moved to the closed position when the striker member 204 is engaged with the latch 26. Exemplary materials for the bumper 236 include, but are not limited to, rubber or other elastomers, polymeric foam, etc.

In the embodiment depicted, the stabilizing member 216 is forked. More specifically, stabilizing member 216 includes a first arm 240 and a second arm 244 spaced apart from the first arm 240. The first arm 240 and the second arm 244 define an open space 248 therebetween. The first arm 240 and the second arm 244 define an opening 252 to the open space 248. In the embodiment depicted, the first arm and the second arm have different widths as shown.

Figure 15:
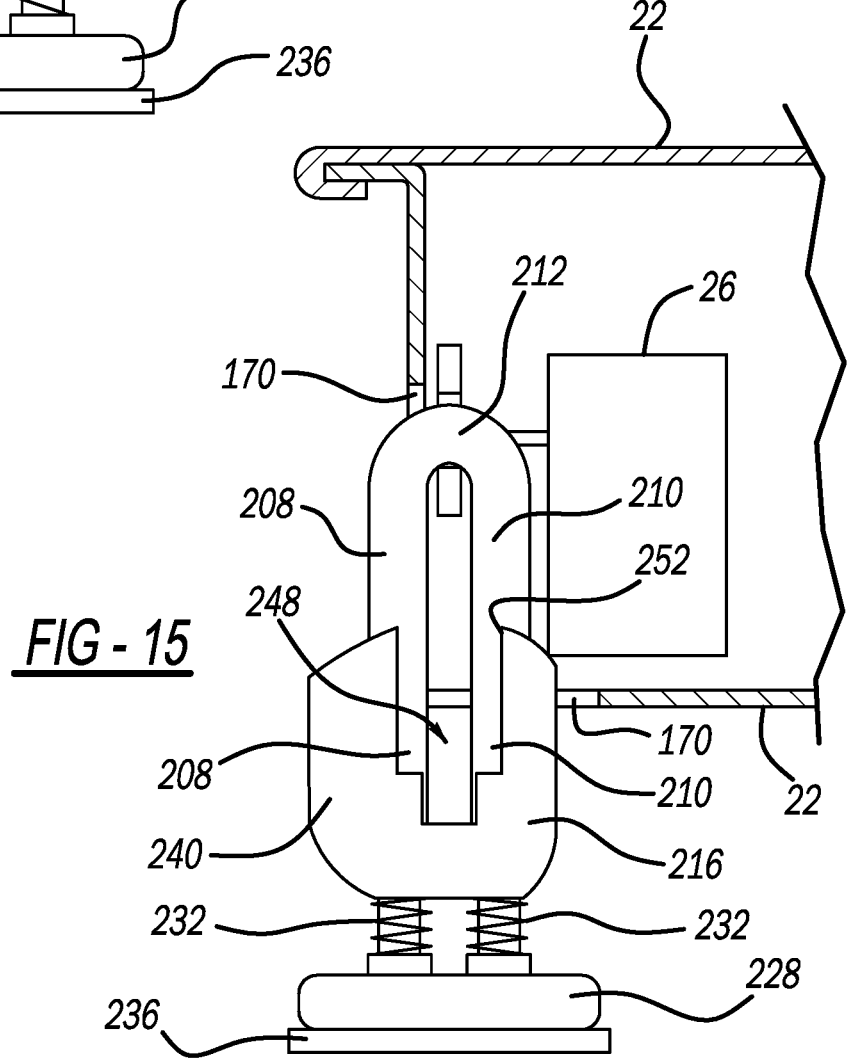
FIG. 15 is a schematic, top, sectional view of the apparatus of claim 14 engaged with the latch of the door.

A method of using the apparatus 200 is similar to the method shown and described in FIGS. 7-13, except that engaging the apparatus 200 with the latch 26 includes inserting portions of the striker member 204 and the stabilizing member 216 into the aperture 170 of the door assembly 22 with the stabilizing member 216 in the first position relative to the striker member 204. The stabilizing member 216 contacts and engages with the inner panel structure that defines the aperture 170 and other structure of the door assembly 22, such as the latch 26, to help retain the striker member 204 in place and align the striker member 204 for engagement with the latch 26, as shown in FIG. 15.

The method also includes pushing the striker member 204 into engagement with the latch 26, such as by exerting a longitudinal force on the bumper 236. The force causes the striker member 204 to move into engagement with the latch 26; however, the interaction between door structure and the stabilizing member 216 causes the stabilizing member 216 to remain stationary relative to the door assembly 22. Accordingly, the force causes the striker member 204 to slide relative to the stabilizing member 216 so that the springs 232 are compressed and the stabilizer member 216 is in a second position relative to the striker member, as shown in FIG. 15.

While the best modes for carrying out the invention have been described in detail, those familiar with the art to which this invention relates will recognize various alternative designs and embodiments for practicing the invention within the scope of the appended claims.

The invention claimed is:

1. An apparatus for use with a vehicle door that is selectively movable between an open position and a closed position, the vehicle door having a latch that is releasably engageable with a striker mounted to a vehicle body when the vehicle door is in the closed position, the apparatus comprising:
   a striker member characterized by a size and shape such that the member is engageable with the latch when the vehicle door is in an open position;
   a bumper mounted with respect to the striker member such that, if the vehicle door is sufficiently moved toward the closed position, the bumper contacts the striker; and
   a stabilizing member connected to the striker member such that, during engagement of the striker member with the latch, interaction between the door and the stabilizing member causes movement of the stabilizing member relative to the striker member.

2. The apparatus of claim 1, wherein the bumper is comprised of an elastomer or foam.

3. The apparatus of claim 1, wherein the stabilizing member includes first and second holes;
   wherein the striker member includes first and second parallel segments;
   wherein the first segment extends through the first hole; and
   wherein the second segment extends through the second hole.

4. The apparatus of claim 3, wherein the stabilizing member is slidable relative to the striker member along the first and second parallel segments.

5. The apparatus of claim 4, further comprising a base member operatively connected to the first and second parallel segments; and
   at least one spring positioned between the stabilizing member and the base member and biasing the stabilizing member away from the base member.

6. The apparatus of claim 5, wherein the striker member includes a third segment interconnecting the first and second parallel segments; and
   wherein the at least one spring biases the stabilizing member toward the third segment.

7. The apparatus of claim 6, wherein said stabilizing member is forked.

8. The apparatus of claim 7, wherein the stabilizing member includes a first arm and a second arm spaced apart from the first arm;
   wherein the first arm and the second arm define an open space therebetween; and
   wherein the first arm and the second arm define an opening to the open space.

9. The apparatus of claim 8, wherein the first arm and the second arm have different widths.

10. A method for use with a vehicle having a body defining a passenger compartment and a door opening, a door selectively movable with respect to the body between an open and closed position, a latch mounted to the door, a striker mounted to the body and positioned to engage the latch when the door is in the closed position, the method comprising:
    moving the door to the open position;
    engaging an apparatus with the latch when the door is in the open position;
    wherein the apparatus includes a striker member being sized and shaped to engage the latch, and a bumper operatively connected to the striker member;
    wherein said engaging an apparatus with the latch includes engaging the striker member with the latch such that the bumper is positioned to contact the striker if the door is sufficiently moved toward the closed position; and
    wherein the apparatus includes a stabilizing member connected to the striker member such that, during engagement of the striker member with the latch, interaction between the door and the stabilizing member causes movement of the stabilizing member relative to the striker member.

11. The method of claim 10,
    wherein the stabilizing member includes first and second holes;
    wherein the striker member includes first and second parallel segments;
    wherein the first segment extends through the first hole;
    wherein the second segment extends through the second hole; and
    wherein the stabilizing member is slidable relative to the striker member along the first and second parallel segments.

12. The method of claim 11, wherein the apparatus further includes a base member operatively connected to the first and second parallel segments; and
    at least one spring positioned between the stabilizing member and the base member and biasing the stabilizing member away from the base member.

13. The method of claim 12, wherein the door defines an aperture; and
    wherein said engaging the apparatus with the latch includes inserting portions of the striker member and the stabilizing member into the aperture, and pushing the striker member into engagement with the latch.

14. The method of claim 13, wherein said engaging the apparatus with the latch includes causing the stabilizer member to contact a portion of the door such that said pushing the striker member into engagement with the latch causes the striker member to slide relative to the stabilizer member and thereby compress said at least one spring.

\* \* \* \* \*